Patented Dec. 9, 1924.

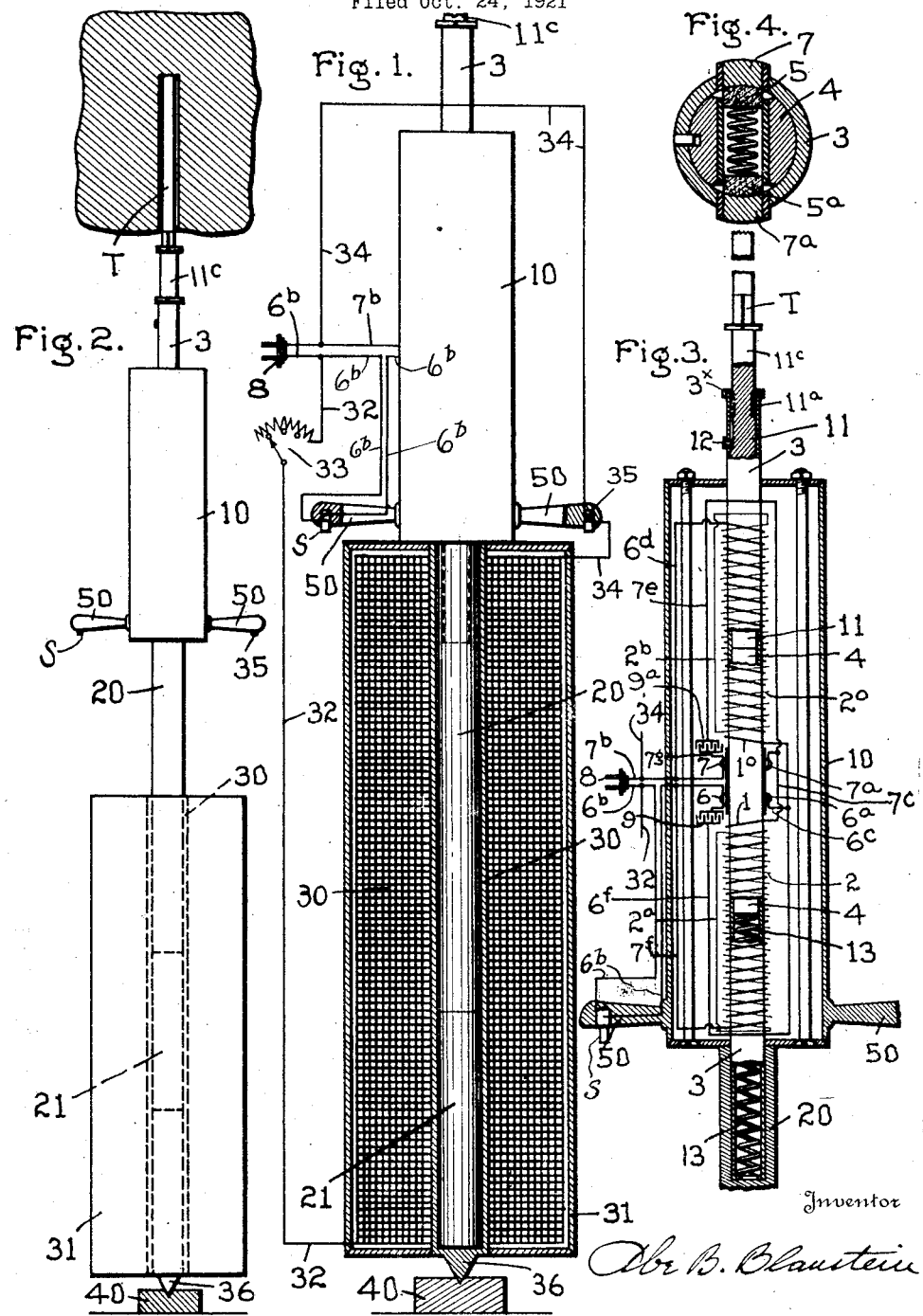

1,518,384

UNITED STATES PATENT OFFICE.

ABE B. BLAUSTEIN, OF BUTTE, MONTANA, ASSIGNOR, BY MESNE ASSIGNMENTS, TO ELECTRICAL DEVELOPMENT CORPORATION, OF BUTTE, MONTANA.

STOPING DRILL.

Application filed October 24, 1921. Serial No. 510,057.

*To all whom it may concern:*

Be it known that I, ABE B. BLAUSTEIN, a citizen of the United States, residing at Butte, in the county of Silver Bow and State of Montana, have invented certain new and useful Improvements in Stoping Drills; and I hereby declare that the following is a full, clear, and exact description thereof, reference being had to the accompanying drawings, which form part of this specification.

This invention is a novel improvement in so-called electro-magnetic drills; and particularly so-called "stoping drills" but is applicable to other tools. The objects of the invention are to provide a stoping drill which can be as easily handled as a compressed air drill; in which the tool can be held at any desired pressure to its work; and in which the action of the drill or tool will be always under the control of the operator.

The invention includes novel electromagnetic means for positioning the drill or tool in operative position without manipulation of any troublesome or time consuming mechanical parts; also means for automatically keeping the drill or tool up to its work as the drill penetrates the rock, earth or material; and also means to enable the drill or tool to be quickly retracted when its work is performed, or it is desired to change the location of the tool. A further object of the invention is to provide an electro-magnetic drill or tool which will be capable of long sustained and severe operation without becoming unduly heated or ineffective.

I will explain the invention with reference to the accompanying drawings which show one practical embodiment of the invention as applied to an electro-magnetic stoping drill, an explanation whereof will enable others to understand and use the invention; and in the claims are summarized the essentials of the invention, and the novel features of construction and the novel combinations of parts for which protection is desired.

In the drawings:

Fig. 1 is a partial sectional elevation of a stoping drill embodying the invention.

Fig. 2 is a side elevation of such stoping drill in operative position.

Fig. 3 is an enlarged diagrammatic sectional view through the electro-magnetic drill proper.

Fig. 4 is a detail sectional view of the drill barrel and core.

In the drawings 10 designates a casing in which are mounted the parts for operating the tool or drill as hereinafter described. This casing is supported on one end of a stem 20 of non-magnetic material which is adapted to enter the bore of a large solenoid 30 and by which the casing is supported and the tool is guided and held to its work.

The solenoid 30 is preferably enclosed in a casing 31 of any suitable construction to protect the wiring from moisture and the corrosive action of mine gases. The solenoid 30 is of any suitable construction and considerable length; or may be of any desired length according to the desired operative range of the tool. As shown it is longer than the body 10 of the drill.

To the end of the non-magnetic stem 20 is attached a core 21 of suitable magnetic material, which is subject to the magnetic action of the solenoid 30. This core 21 is much shorter than the bore of the solenoid 30; and when the solenoid is energized the core will be drawn inward or upward and move the casing 10 upward or endwise away from the upper end of the solenoid.

One terminal of the solenoid 30 is connected by a wire 32 to a conductor $6^b$ connected with one pole of a suitable source of electricity. Preferably a rheostat 33 is interposed in the conductor 32 so that more or less of the current can be turned into the solenoid 30 at the will of the operator. The other terminal of the solenoid 30 is connected by a wire 34 to a conductor $7^b$ leading to the other pole of the source of electricity. The conductors $6^b$, $7^b$ may be connected to a plug 8 for ready connection with or disconnection from the source of electricity (not shown).

Preferably a suitable manually controlled switch 35 (conventionally illustrated as a push button in Fig. 1) is inserted in the wire 34 so that the electric circuit through the solenoid 30 will be open, unless such switch 35 is closed; so that the solenoid will only be energized when such switch is closed.

Preferably switch 35 is mounted on one of the handles 50 of the casing 10 (as shown) so that the operator may readily control the switch 35 to open or close the circuit through solenoid 30.

The casing 10 preferably contains electro-magnetic drill operating devices constructed as shown described and claimed in my companion application filed October 17, 1921, Serial No. 508,415.

As shown the casing 10 is preferably provided with handles 50 whereby the casing and tool can be rocked or turned manually during the operation of the drill, as is usual in working ordinary stoping drills.

As shown in said application the drill operating devices include a barrel 3, in which is a core or piston 4. The barrel is surrounded by two oppositely wound primary solenoids 1 and $1^o$ which are alternately energized to move the core 4 to the right or left or up and down to impart reciprocatory movements to the core. Around each primary solenoid is one of the oppositely wound secondary solenoids 2, $2^o$ each of which is in a closed circuit, as indicated at $2^a$ and $2^b$.

The electric current may be supplied to the primary solenoids from any suitable source of electricity, and may be caused to alternately energize them by any suitable means. As shown core 4 is provided with connected brushes 5 and $5^a$, (see Fig. 4) which are adapted to alternately close a circuit between the pairs of related, but opposed contacts 6, $6^a$ and 7, $7^a$ preferably mounted on the barrel as explained in my said application.

As shown, the contact 6 is connected to the conductor $6^b$. The contact $6^a$ is connected by a wire $6^c$ to one terminal of the primary solenoid $1^o$; and the other terminal of said solenoid is connected by a wire $6^d$ to the conductor $7^b$. The contact 7 is connected to the conductor $7^b$; the contact $7^a$ is connected by a wire $7^c$ to one terminal of the primary solenoid 1; and the other terminal of said solenoid is connected by a wire $7^f$ with the conductor $6^b$. A suitable switch should be provided to open or close the circuit through the primary solenoids at the will of the operator, to enable him to control the operation of the drill 1.

The circuit through the primary solenoids 1 and $1^o$ should be controllable independently of the circuit through the solenoid 30. This may be done by a suitable switch, placed at any suitable point, as described in my aforesaid application.

In the construction shown, a switch, indicated at S (conventionally illustrated as a push button in Fig. 1), is mounted on one of the handles 50 of the casing 10, and is connected in the line of the conductor $6^b$ at a suitable point between the plug 8 and the connection of the wire $7^f$ to the conductor $6^b$; so that by opening or closing switch S the passage of current through the primary solenoids 1 and $1^o$, and the consequent reciprocation of the tool or drill T can be controlled by the operator, at will, independently of the circuit through the main solenoid 30 which is independently controllable by switch 35 and rheostat 33 as described.

To prevent sparking when the brushes separate from the contacts, check the current in the primary solenoids and step up the current in the related secondary solenoids, the primary solenoid $1^o$ is provided with a condenser $9^a$, one member of which is connected to contact 7 by wire $7^g$ and the other member of the condenser is connected to contact $7^a$ by wire $7^e$. The primary solenoid 1 is also provided with a condenser 9, one member of which is connected to the contact 6 by wire $6^e$ and the other member is connected to contact $6^a$ by wire $6^f$. When brushes 5, $5^a$ separate from the contacts 7, $7^a$ the condenser 9 acts; when the piston moves up the brushes 5, $5^a$ break contact with the contacts 6 and $6^a$ and the condenser $9^a$ acts.

As shown, Fig. 3, a tappet 11 is placed in barrel 3, and is adapted to be struck by the core or hammer 4. The tappet may be provided on its outer end with a tool holder $11^c$, which may be of any suitable construction, to which a drill or other tool T may be detachably attached. The outer end of barrel 3 may be provided with a ring or collar $3^x$, and adjacent the end of the barrel 3 is a pin 12, extending into the bore of the barrel and engaging a longitudinal slot in the tool holder $11^c$ to prevent rotation of the latter. The tappet is normally moved toward the solenoid 1 by a helical spring $11^a$; and a spring 13 may be placed in the end of the barrel 3, opposite the tappet, the springs being so proportioned that they will cause the core to assume such a position (as indicated in Fig. 4) when the switch S is open and there is no electrical current traversing the coils; that the drill will operate whenever the switch S is closed.

The stoping drill is positioned for operation in the mine in the usual way, as by resting the bottom of the solenoid casing 30 upon a suitable support. Said casing may be provided with a stud 36 on its lower end adapted to engage a block 40 placed on the floor of the stope, then switch 35 is closed to direct the current through the solenoid 30 which acts on core 21 and raises it and the stem 20, carrying the drill operating devices, until the drill or tool T strikes the surface to be drilled.

Assuming that the parts are in operative position as shown in Fig. 1; when the switch S is closed an electrical circuit is established through the right hand set of contacts from the source of electrical energy through the primary solenoid 1 and it draws the core or piston down; the circuit through solenoid 1 is doubly broken the instant that the brushes 5, 5ª clear the contacts 7, 7ª, but the core moves on until the brushes 5, 5ª contact with the contacts 6, 6ª whereupon a circuit is closed through the primary solenoid 1°, which then operates to draw the core 4 up. The duration of the circuit through either primary solenoid is of course short and is broken as soon as the core moves sufficiently to separate the brushes from the contacts.

The secondary solenoids 2, 2° are so wound that the current induced therein operates reversely to the current transmitted through the respective primary solenoids 1, 1°. Each secondary solenoid acts immediately upon the breaking of the primary circuit in the related primary solenoid, and nullifies or obviates any residual magnetism or hysteresis produced in such primary solenoid, and the core by the immediately preceding action of such primary solenoid, and thus obviates or lessens the heating of the solenoids 1, 1° and core 4 which would otherwise become too hot under severe or long usage.

In practically using the invention in drills, I have found that such secondary solenoids prevent undue heating of the machine; and that the speed of reciprocation of the core is materially increased; and the power obtained from (or effective blow delivered by) a certain size of primary solenoid with a certain strength of current, is materially increased; an actual drilling tool embodying the invention showing about 25% increase in foot pounds efficiency over drills having the same size of primary solenoids and energized by same current but without the secondary solenoids and condensers.

As the drilling tool penetrates the material the drilling tool may be advanced to its work by increasing the current in the solenoid 30 by adjusting the rheostat 33. The operator can hold the drill to its work with any desired degree of pressure; and can quickly raise the drill to its operative position by increasing the current in the solenoid 30 through the rheostat. When the drilling operation is completed the drill can be withdrawn or lowered by reducing the current in the solenoid 30 by properly shifting the rheostat 33 the drill dropping by gravity when it is used as a stoping drill.

In practical use I propose to use a switch of such construction (same being well known) that the operator will be able to control the lift of the casing and the operation of the tool or drill devices through one of the handles, preferably using a two point one way switch. First point to cut in the solenoid 30 and second point to maintain current therein and cuts in the circuit through solenoids 1 and 1°.

Obviously the invention could be applied to other styles of tools or drills used vertically, horizontally or at any desired inclination; in such cases the solenoid 30 might be adjustably mounted in any well known manner on support, such as and with ordinary drills, and the solenoid can be used to project the drill away from the solenoid and hold it to its work with the desired degree of pressure.

What I claim is:

1. In a stoping drill, a solenoid, a core, means for controlling the electric circuit through the solenoid, an electrical reciprocating drill actuating mechanism mounted on said core, and means for controlling the electric circuit through the drill actuating mechanism, independently of the circuit through the solenoid.

2. In combination a solenoid, a core therefor, a non-magnetic stem operated by the core, and a reciprocating tool connected with the stem and adapted to be held to its work by the solenoid.

3. In a stoping drill, a solenoid, a core therefor, a non-magnetic stem connected with the core, and a reciprocating drill actuating mechanism mounted on the stem and adapted to be held to its work by the solenoid.

4. In combination a casing, reciprocating tool actuating devices therein, a non-magnetic stem connected with said casing, a magnetic core supporting said stem; and a solenoid surrounding the core and guiding the stem to support the casing and hold the tool to its work.

5. In combination a solenoid, a core, means for establishing an electric circuit through the solenoid, a non-magnetic member operated by the core, and a reciprocating tool actuating mechanism mounted on said stem.

6. In a stoping drill, a solenoid, a core, a non-magnetic member operated by the core, and guided by the solenoid, and a reciprocating electro-magnetic drill mounted on said member, substantially as described.

7. In a stoping drill, a solenoid, a core, means for controlling the electric circuit through the solenoid, a non-magnetic member attached to the core and guided by the solenoid, and an electro-magnetic reciprocating drill mounted on said member, substantially as described.

8. In a stoping drill a solenoid, a core, means for controlling the electric current through the solenoid, a non-magnetic member attached to the core and guided by the solenoid, a casing mounted on said member, an electro-magnetic reciprocating drill mounted in said casing, and means for controlling the electric current through the drill independently of the circuit through the solenoid.

In testimony that I claim the foregoing as my own, I affix my signature.

ABE B. BLAUSTEIN.